(12) United States Patent
Kim et al.

(10) Patent No.: US 8,645,981 B2
(45) Date of Patent: Feb. 4, 2014

(54) DISK CHUCKING APPARATUS

(75) Inventors: Nam Seok Kim, Gyunggi-do (KR); Ho Jun Yoo, Gyunggi-do (KR); Chang Keun Jun, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 214 days.

(21) Appl. No.: 12/717,843

(22) Filed: Mar. 4, 2010

(65) Prior Publication Data

US 2011/0131592 A1 Jun. 2, 2011

(30) Foreign Application Priority Data

Nov. 30, 2009 (KR) .................. 10-2009-0117157

(51) Int. Cl.
*G11B 17/022* (2006.01)
*G11B 17/02* (2006.01)

(52) U.S. Cl.
USPC ............................ 720/703; 720/706; 720/707

(58) Field of Classification Search
USPC .......... 720/703–704, 706–707, 709, 712, 715
See application file for complete search history.

(56) References Cited

U.S. PATENT DOCUMENTS

| 5,633,856 A * | 5/1997 | Mukawa ...................... 720/712 |
| 7,036,135 B2 * | 4/2006 | Hsu et al. ...................... 720/707 |
| 2008/0189730 A1 * | 8/2008 | Takaki et al. .................. 720/706 |

FOREIGN PATENT DOCUMENTS

| JP | H05-43344 | 6/1993 |
| JP | 11-238275 | 8/1999 |
| JP | 2005-044449 | 2/2005 |
| JP | 2006-092669 | 4/2006 |
| KR | 1020020061273 A | 7/2002 |
| KR | 1020030010883 A | 2/2003 |

* cited by examiner

*Primary Examiner* — Will J Klimowicz
*Assistant Examiner* — Carlos E Garcia
(74) *Attorney, Agent, or Firm* — Bracewell & Giuliani LLP (57) ABSTRACT

Disclosed herein is a disk chucking apparatus. The apparatus includes a central boss which is coupled to a rotating shaft of a motor, a guide which extends from the central boss outwards and is inserted into a center hole of a disk, and a chucking unit which extends from the central boss outwards. The chucking unit is elastically deformable inwards when pushed by the disk that is fitted over the guide. The chucking unit includes a lower horizontal part, a vertical part and an upper horizontal part. The lower horizontal part extends from the lower portion of the central boss outwards in the horizontal direction. The vertical part is bent from the outer end of the lower horizontal part upwards. The vertical part extends in a direction inclined outwards. The upper horizontal part extends from the upper end of the vertical part inwards in a horizontal direction.

13 Claims, 8 Drawing Sheets

FIG.1

Prior art

FIG.2

Prior art

FIG. 11

DISK CHUCKING APPARATUS

CROSS REFERENCE TO RELATED APPLICATION

This application claims the benefit of Korean Patent Application No. 10-2009-0117157, filed Nov. 30, 2009, entitled "Disk chucking apparatus", which is hereby incorporated by reference in its entirety into this application.

BACKGROUND OF THE INVENTION

1. Technical Field

The present invention relates to a disk chucking apparatus.

2. Description of the Related Art

Generally, in spindle motors for rotating optical recording media, such as optical disks, hard disks, etc., at high speed, an oil film is formed between a bearing and a rotating shaft using a lubricant to rotatably support the rotating shaft. Thus, high quality rotational characteristics can be ensured. Hereby, the spindle motors are widely used as a drive means for recording media, such as hard disk drives, optical disk drives, etc., which require high speed rotation.

In relation to such a spindle motor, a disk chucking apparatus holds a disk which is rotated in one direction by the rotating force of the spindle motor. The performance of the disk chucking apparatus is a very important factor in reliable rotation of the disk and alignment of the center of the disk with the center of rotation.

Figure 1:
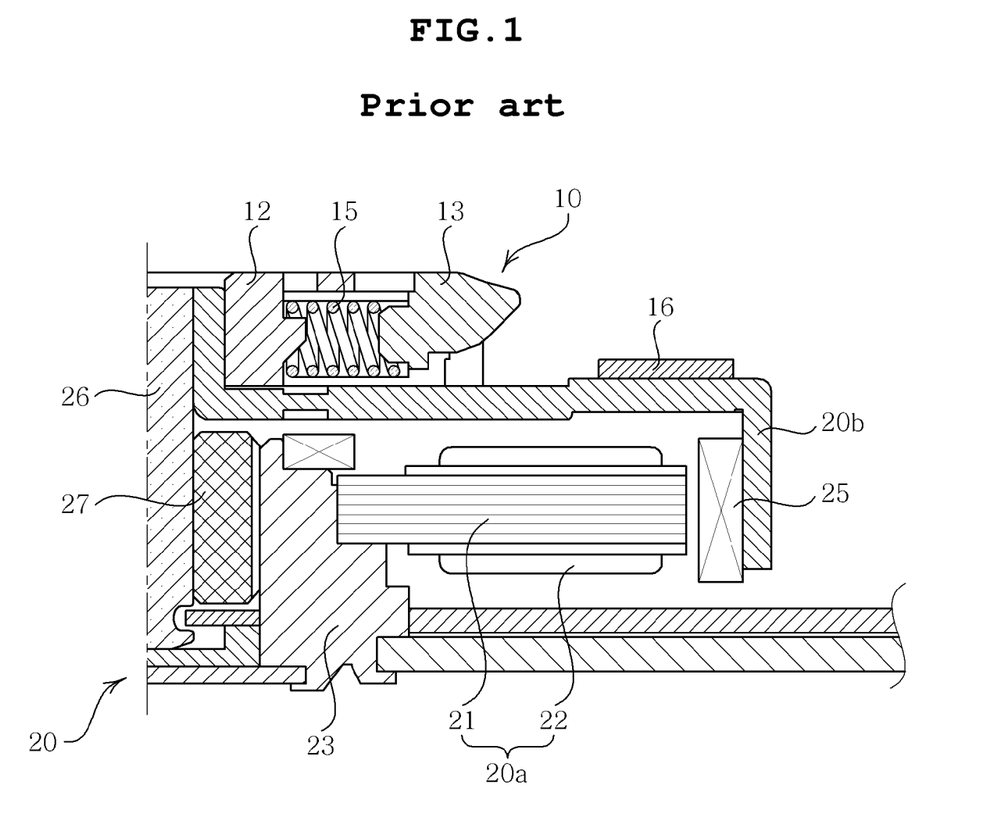
FIG. 1 is a partial sectional view of a spindle motor having a disk chucking apparatus, according to a conventional technique.
Figure 2:
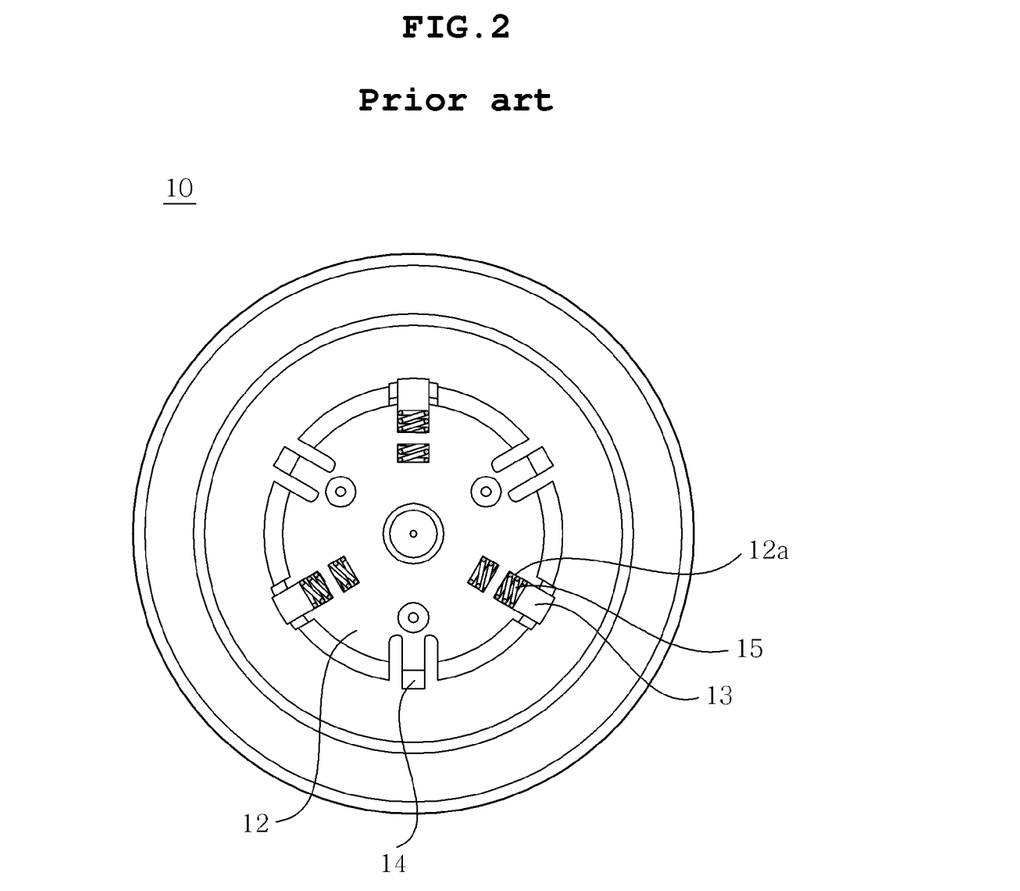
FIG. 2 is a plan view of the disk chucking apparatus of FIG. 1.

In other words, the disk chucking apparatus must be able to prevent the optical recording media from slipping or becoming dislodged when the spindle motor rotates at high speed and facilitate mounting/removal of the optical recording media without damaging the optical recording media or requiring excessive force. FIG. 1 is a partial sectional view of a spindle motor 20 having a disk chucking apparatus 10 according to a conventional technique which is for achieving the above purposes. FIG. 2 is a plan view of the disk chucking apparatus 10 of FIG. 1.

As shown in FIGS. 1 and 2, the disk chucking apparatus 10 according to the conventional technique includes a chuck base 12 which is provided on an upper surface of a rotor 20b which has a magnet 25 interacting with a stator 20a of the spindle motor 20. The chuck base 12 is inserted into a center hole of a disk. Seating slots 12a which radially extend predetermined lengths are formed in the upper surface of the chuck base 12 at positions spaced apart from each other along the periphery of the chuck base 12.

A chuck pin 13 is provided in each seating slot 12a so as to be movable along the seating slot 12a. The chuck pin 13 is biased outwards by elastic force of a spring 15. Elastic pieces 14 are provided in the chuck base 12 between the seating slots 12a. The elastic pieces 14 elastically support, using their own elastic force, the disk which is fitted over the chuck base 12.

In FIGS. 1 and 2, reference numeral 16 denotes a slip prevention member 16 which comes into contact with the lower surface of the disk. Reference numeral 23 denotes a holder for holding the stator 20a. Reference numeral 26 denotes a shaft which supports rotation of the rotor 20b with respect to the stator 20a. Reference numeral 27 denotes a bearing.

A process of mounting the disk to the rotor 20b using the disk chucking apparatus 10 according to the conventional technique having the above-mentioned construction will be explained. In the disk chucking apparatus 10, the outer diameter of the chuck base 12 is smaller than the inner diameter of the center hole of the disk, but the outer ends of the chuck pins 13 which are installed in the chuck base 12 radially protrude outwards from the chuck base 12. Therefore, when the disk is pushed vertically downwards above the chuck base 12, the lower edge of the circumferential inner surface of the center hole of the disk comes into contact with the chuck pins 13.

Each chuck pin 13 has a tapered structure such that the outer end of the upper surface thereof is gently inclined downwards. Thus, when the disk is fitted over the disk chucking apparatus 10, the chuck pins 13 are pushed inwards by the force of pushing the disk downwards and compress the corresponding springs 15. Simultaneously, the elastic pieces 14 are also pushed inwards and elastically deformed.

Thereafter, when the disk comes into contact with the annular slip prevention member 16 which is attached on the upper surface of the rotor 20b, the chuck pins 13 are returned to their original positions by elastic restoring force of the springs 15 which have been compressed. Thereby, the disk can be retained in the state of having been fitted over the chuck base 12, thus completing the chucking of the disk.

However, in the conventional disk chucking apparatus 10, because the separate chuck pins 13 are movably installed in the chuck base 12 and the springs 15 are interposed between the chuck base 12 and the chuck pins 13, the structure of the disk chucking apparatus 10 is complicated. Furthermore, the chuck pins 13 must be manufactured through separate processes. It is not easy to assemble the chuck pins 13 with the chuck base 12.

SUMMARY OF THE INVENTION

The present invention has been made in an effort to provide a disk chucking apparatus which uses structural elastic force and thus simplifies the structure thereof.

A disk chucking apparatus according to an embodiment of the present invention chucks a disk placed onto a rotor casing coupled to a motor for providing a rotating force to the rotor casing. A central boss is coupled to a rotating shaft of the motor. A guide extends from the central boss outwards. The guide is inserted into a center hole of the disk. A chucking unit extends from the central boss outwards. The chucking unit is elastically deformable inwards when being pushed by the disk that is fitted over the guide. In the chucking unit, a lower horizontal part extends from a lower portion of the central boss outwards in a horizontal direction. A vertical part is bent from an outer end of the lower horizontal part upwards. The vertical part extends a predetermined length in a direction inclined outwards. An upper horizontal part extends from an upper end of the vertical part inwards in a horizontal direction.

Furthermore, an elastic member may be provided between the central boss and the vertical part to provide an elastic force inwards to the vertical part.

The lower horizontal part or the upper horizontal part may have an opening therein.

The lower horizontal part may be either in contact or not in contact with the rotor casing.

In addition, an elastic piece may be integrally provided in a circumferential outer surface of the guide. The elastic piece may have an outer end coming into contact with a circumferential inner surface of the center hole of the disk to elastically support the disk using elastic force inherent thereto.

The guide may comprise a plurality of guides spaced apart from each other at regular angular intervals around the central boss. The chucking unit may comprise a plurality of chucking units spaced apart from each other at regular angular intervals around the central boss.

A disk chucking apparatus according to another embodiment of the present invention chucks a disk placed onto a rotor casing coupled to a motor for providing a rotating force to the rotor casing. A central boss is coupled to a rotating shaft of the motor. A guide extends from the central boss outwards. The guide is inserted into a center hole of the disk. A chucking unit extends from the central boss outwards. The chucking unit is elastically deformable inwards when being pushed by the disk that is fitted over the guide. In the chucking unit, a vertical part extends from the rotor casing upwards. The vertical part extends a predetermined length in a direction inclined outwards. An upper horizontal part extends from an upper end of the vertical part inwards in a horizontal direction.

Furthermore, an elastic member may be provided between the central boss and the vertical part to provide an elastic force inwards to the vertical part.

The upper horizontal part may have an opening therein.

The chucking unit may be integrated with the rotor casing.

In addition, an elastic piece may be integrally provided in a circumferential outer surface of the guide. The elastic piece may have an outer end coming into contact with a circumferential inner surface of the center hole of the disk to elastically support the disk using elastic force inherent thereto.

The guide may comprise a plurality of guides spaced apart from each other at regular angular intervals around the central boss. The chucking unit may comprise a plurality of chucking units spaced apart from each other at regular angular intervals around the central boss.

A disk chucking apparatus according to another embodiment of the present invention chucks a disk placed onto a rotor casing coupled to a motor for providing a rotating force to the rotor casing. A central boss is coupled to a rotating shaft of the motor. A guide extends from the central boss outwards. The guide is inserted into a center hole of the disk. A chucking unit extends from the central boss outwards. The chucking unit is elastically deformable inwards when being pushed by the disk that is fitted over the guide. In the chucking unit, an upper horizontal part extends from an upper portion of the central boss outwards in a horizontal direction. A vertical part extends from the upper horizontal part downwards. The vertical part extends a predetermined length in a direction inclined inwards.

Furthermore, an elastic member may be provided between the central boss and the vertical part to provide an elastic force inwards to the vertical part.

The upper horizontal part may have an opening therein.

In addition, an elastic piece may be integrally provided in a circumferential outer surface of the guide. The elastic piece may have an outer end coming into contact with a circumferential inner surface of the center hole of the disk to elastically support the disk using elastic force inherent thereto.

The guide may comprise a plurality of guides spaced apart from each other at regular angular intervals around the central boss. The chucking unit may comprise a plurality of chucking units spaced apart from each other at regular angular intervals around the central boss.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components. In the following description, when it is determined that the detailed description of the conventional function and conventional structure would confuse the gist of the present invention, such a description may be omitted. Furthermore, the terms and words used in the specification and claims are not necessarily limited to typical or dictionary meanings, but must be understood to indicate concepts selected by the inventor as the best method of illustrating the present invention, and must be interpreted as having had their meanings and concepts adapted to the scope and sprit of the present invention so that the technology of the present invention could be better understood.

Hereinafter, embodiments of the present invention will be described in detail with reference to the attached drawings.

Disk Chucking Apparatus

First Embodiment

Figure 3:
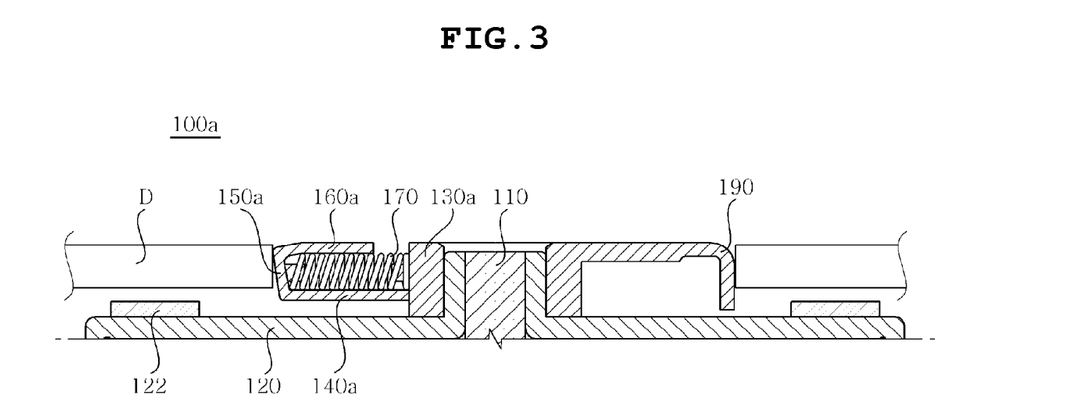
FIG. 3 is a sectional view illustrating a disk chucking apparatus, according to a first embodiment of the present invention.
Figure 4:
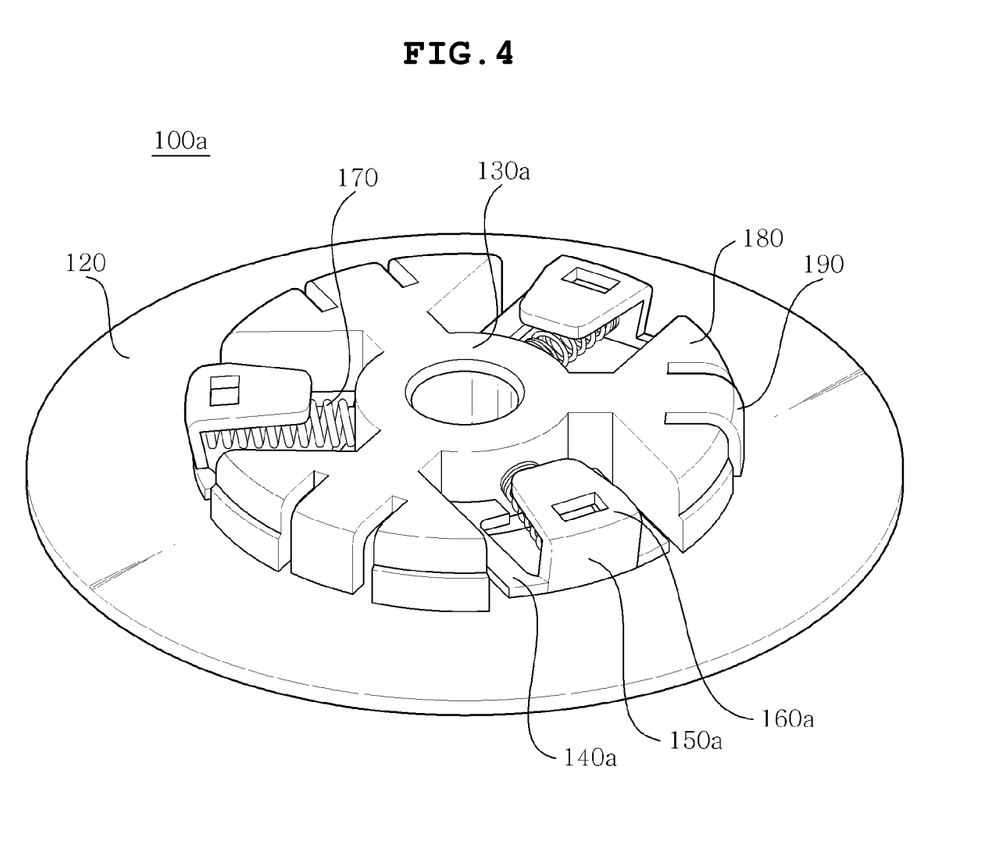
FIG. 4 is a perspective view of the disk chucking apparatus of FIG. 3.

FIG. 3 is a sectional view illustrating a disk chucking apparatus 100a, according to a first embodiment of the present invention. FIG. 4 is a perspective view of the disk chucking apparatus 100a. The disk chucking apparatus 100a according to the first embodiment of the present invention will be explained with reference these drawings.

As shown in FIGS. 3 and 4, the disk chucking apparatus 100a according to the first embodiment is coupled to a motor (spindle motor) which provides rotating drive force. The disk chucking apparatus 100a functions to chuck a disk D mounted onto a rotor casing 120 and includes a central boss 130a, guides 180 and chucking units.

The rotor casing 120 is an element onto which the disk D is placed. The rotor casing 120 is configured such that the central portion thereof protrudes upwards. A coupling hole (not shown) having the same diameter as that of a rotating shaft 110 is formed through the central portion of the rotor casing 120. Thus, the rotor casing 120 is force-fitted over or adhered to the rotating shaft 110 through the coupling hole. A slip prevention member 122 for preventing slip of the disk D may be attached to the perimeter of the upper surface of the rotor casing 120. In FIG. 3, although the disk D and the disk chucking apparatus 100a have been illustrated as being directly provided on the upper surface of the rotor casing 120, they may be provided on a separate turntable (not shown) which is assembled on the upper surface of the rotor casing 120.

The central boss 130a rotates in one direction along with the rotor casing 120 and the disk D when the motor is operated. The central boss 130a has a hollow cylindrical structure, is fitted at the center thereof over the rotating shaft 110, and extends outwards from the center thereof in the radial direction. The guides 180 and the chucking units are integrally provided in the portion of the central boss 130a which extends from the center thereof outwards.

The guides 180 guide the disk D such that the center hole of the disk D is correctly fitted over the disk chucking apparatus 100a. The guides 180 extend from the central boss 130a outwards in radial directions. The guides 180 are provided around the central boss 130a at positions spaced apart from each other at regular angular intervals. In the embodiment, three guides 180 are provided at angular intervals of 120°. Here, the outer edges of the guides 180 are round to smoothly guide the disk D such that the center hole of the disk D is easily fitted over the disk chucking apparatus 100a. Furthermore, in the embodiment, an elastic piece 190 is integrally provided in the circumferential outer surface of each guide 180. Both side edges of the elastic part 190 are separated from the guide 180. The elastic pieces 190 of the guides 180 come into contact with the circumferential inner edge of the center hole of the disk D which is fitted over the disk chucking apparatus 100a, thus elastically supporting the disk D using its own elastic force.

The chucking units extend from the central boss 130a outwards in radial directions so as to be elastically contractable inwards to releasably hold the disk D which is fitted over the disk chucking apparatus 100a. The chucking units are provided around the central boss 130a at positions spaced apart from each other at regular angular intervals. In the embodiment, three chucking units are provided at angular intervals of 120°.

In detail, each chucking unit includes a lower horizontal part 140a, a vertical part 150a and an upper horizontal part 160a. The lower horizontal part 140a extends outwards from the lower portion of the central boss 130a in the approximately horizontal direction. The vertical part 150a is bent upwards from the outer end of the lower horizontal part 140a and extends a predetermined length in a direction inclined outwards. The upper horizontal part 160a extends inwards from the upper end of the vertical part 150a in the horizontal direction. The chucking unit having the above-mentioned structure is elastically deformable inwards, in a direction in which the disk D is mounted to the disk chucking apparatus 100a, and/or in a direction in which the disk D is removed therefrom. Thus, the chucking units enable the disk D to be mounted to/removed from the disk chucking apparatus 100a and function to retain the disk D that is mounted to the disk chucking apparatus 100a.

The lower horizontal part 140a extends outwards from the central boss 130a such that it is maintained in a state of being spaced apart from the rotor casing 120 by a predetermined distance. Thus, a first displacement space is defined by the distance by which the lower horizontal part 140a is spaced apart from the rotor casing 120. In other words, when the force of fitting the disk D over the disk chucking apparatus 100a is applied to the chucking unit, the chucking unit including the lower horizontal part 140a can be elastically deformed in the first displacement space. In the embodiment, the lower horizontal part 140a has a partially-open structure, in other words, has an opening in a predetermined portion thereof, to increase its own elastic force.

The vertical part 150a is able to be elastically deformed inwards by the force with which the disk D is mounted to or removed from the disk chucking apparatus 100a, thus making the chucking of the disk D possible. In addition, the vertical part 150a functions to hold the disk D mounted to the disk chucking apparatus 100a.

The upper horizontal part 160a is bent inwards from the upper end of the vertical part 150a and extends in an approximately horizontal direction. The inner end of the upper horizontal part 160a is spaced apart from the central boss 130a by a predetermined distance. A second displacement space is defined by the distance by which the inner end of the upper horizontal part 160a is spaced apart from the central boss 130a. The second displacement space enables the chucking unit including the upper horizontal part 160a to be elastically deformed inwards. Here, the outer end of the upper horizontal part 160a which is connected to the upper end of the vertical part 150a has a ramp structure to facilitate the insertion of the chucking unit into the center hole of the disk D. In the embodiment, the upper horizontal part 160a has a partially-open structure, in other words, has an opening in a predetermined portion thereof, to increase its own elastic force.

Meanwhile, the chucking unit having the above-mentioned structure may function to chuck the disk D using only its own elastic force. Furthermore, to prevent the chucking unit from becoming plastically deformed, in particular, during the mounting of the disk D, by the force applied thereto in the direction in which the disk D is mounted to the disk chucking apparatus 100a, an elastic member 170 may be interposed between the vertical part 150a and the central boss 130a to provide elastic force inwards with respect to the vertical part 150a. For example, a spring can be used as the elastic member 170.

FIGS. 5A through 5D are views illustrating a process of mounting the disk D to the disk chucking apparatus 100a. Hereinafter, the operation of the disk chucking apparatus 100a according to the first embodiment will be explained with reference to these drawings.

Figure 5:
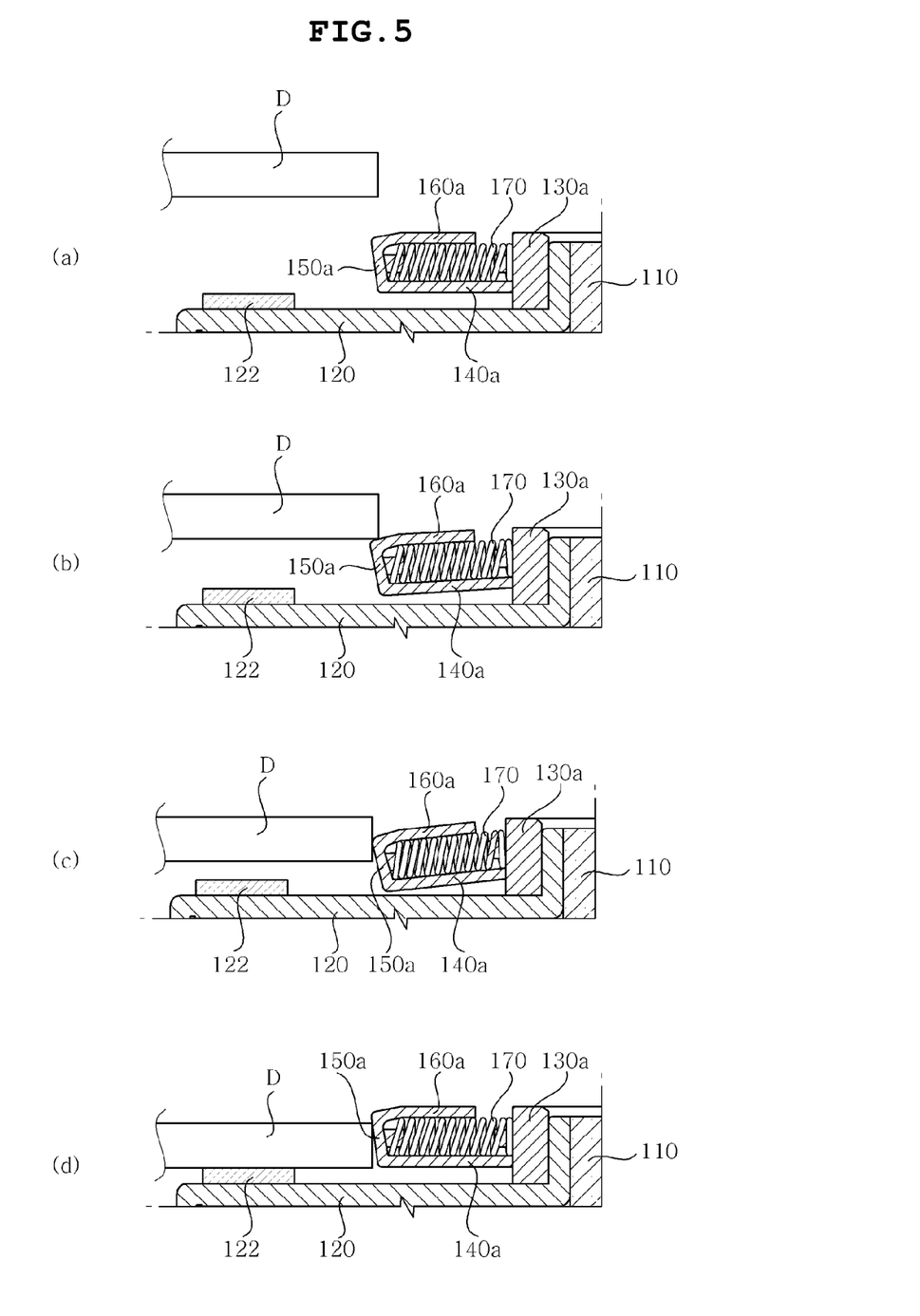
FIGS. 5A through 5D are views illustrating a process of mounting a disk to the disk chucking apparatus of FIGS. 3 and 4.

As shown in FIG. 5A, a user disposes the disk D above the disk chucking apparatus 100a such that the center hole of the disk D corresponds to the guides 180.

Thereafter, as shown in FIG. 5B, the user pushes the disk D vertically downwards. Here, the outer diameter of the guides 180 is smaller than the diameter of the center hole of the disk D. However, because the outer ends of the chucking units, in detail, the upper ends of the vertical parts 150a which are inclined outwards and the outer ends of the upper horizontal parts 160a, protrude outwards from the guides 180, the circumferential inner edge of the disk D which defines the center hole comes into contact with the outer ends of the chucking units.

Subsequently, as shown in FIG. 5C, when the user further pushes the disk D vertically downwards, the chucking units are slightly bent downwards in the first displacement spaces of the lower horizontal parts 140a by the force applied thereto in the direction in which the disk D is fitted over the disk chucking apparatus. In addition, the upper horizontal parts 160a of the chucking units are elastically deformed inwards in the second displacement spaces by the force applied to the chucking units inwards. As a result, the disk D is completely fitted over the disk chucking apparatus. Here, when the chucking units are elastically deformed downwards by the force applied to the chucking units in the direction in the direction in which the disk D is fitted over the disk chucking apparatus, the elastic members 170 provide an inwards elastic force to the chucking units, thus preventing the chucking units from becoming plastically deformed.

Finally, as shown in FIG. 5D, when the mounting of the disk D to the disk chucking apparatus is completed, the chucking units are returned to their original states by their own elastic force. Thereby, the vertical parts 150a which are inclined outwards hold the disk D, thus fastening the disk D to the disk chucking apparatus.

Meanwhile, although it is not shown in the drawings, removal of the disk D from the disk chucking apparatus is processed in reverse order to the disk mounting process.

Disk Chucking Apparatus

Second Embodiment

Figure 6:
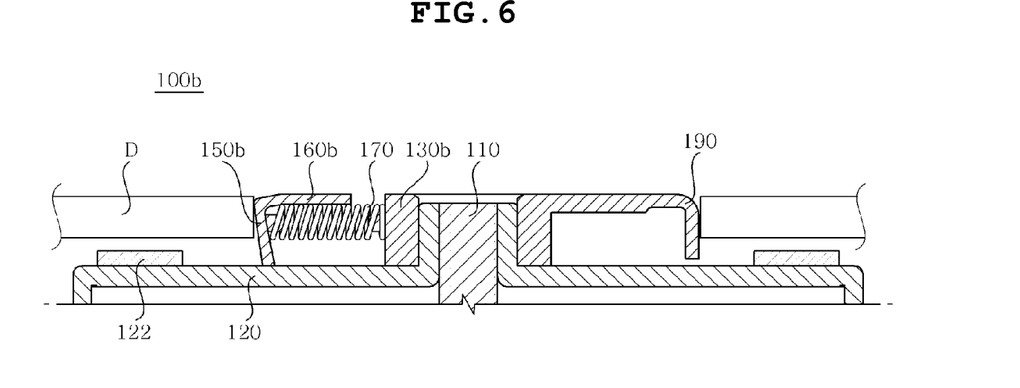
FIG. 6 is a sectional view illustrating a disk chucking apparatus, according to a second embodiment of the present invention.
Figure 7:
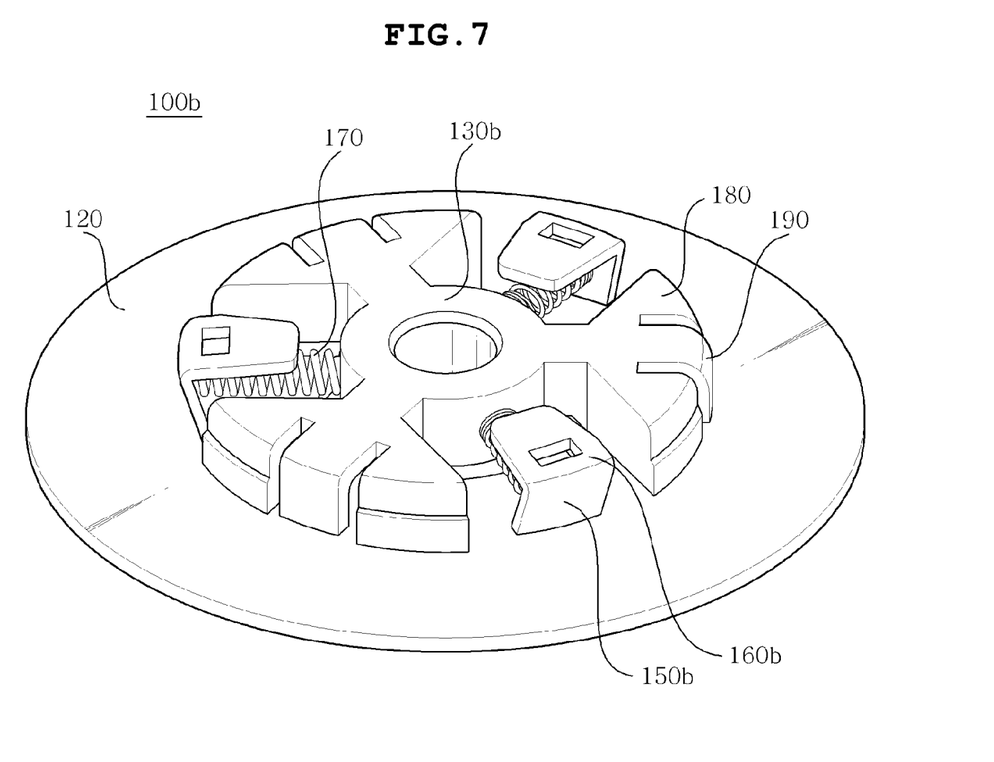
FIG. 7 is a perspective view of the disk chucking apparatus of FIG. 6.

FIG. 6 is a sectional view illustrating a disk chucking apparatus 100b, according to a second embodiment of the present invention. FIG. 7 is a perspective view of the disk chucking apparatus 100b. Hereinafter, the disk chucking apparatus 100b according to the second embodiment of the present invention will be described with reference to these drawings. The general construction of the second embodiment is similar to that of the first embodiment except for the structure of a chucking unit, so that the same or corresponding reference numerals are used to designate the same or similar components, and explanation of the overlapped portions will be omitted.

As shown in FIGS. 6 and 7, in the disk chucking apparatus 100b according to the second embodiment, each chucking unit includes a vertical part 150b and an upper horizontal part 160b. The vertical part 150b extends from an upper surface of a rotor casing 120 upwards and is inclined outwards. The upper horizontal part 160b extends inwards from the upper end of the vertical part 150b in an approximately horizontal direction.

The vertical part 150b can be elastically deformed inwards by the force applied thereto when the disk D is mounted to or removed from the disk chucking apparatus 100b, thus making the chucking of the disk D possible. Furthermore, the vertical part 150b functions to hold the disk D which is completely fitted over the disk chucking apparatus 100b.

The upper horizontal part 160b is bent inwards from the upper end of the vertical part 150b and extends in an approximately horizontal direction. The inner end of the upper horizontal part 160b is spaced apart from a central boss 130b by a predetermined distance. A displacement space is defined by the distance by which the inner end of the upper horizontal part 160b is spaced apart from the central boss 130b. The displacement space enables the chucking unit including the upper horizontal part 160b to be elastically deformed inwards. Here, the outer end of the upper horizontal part 160b which is connected to the upper end of the vertical part 150b has a ramp structure to facilitate the insertion of the chucking unit into the center hole of the disk D. In the embodiment, the upper horizontal part 160b has a partially-open structure, in other words, has an opening in a predetermined portion thereof, to increase its own elastic force.

FIGS. 8A through 8D are views illustrating a process of mounting the disk D to the disk chucking apparatus 100b of FIGS. 6 and 7. Hereinafter, the operation of the disk chucking apparatus 100b according to the second embodiment will be explained with reference to these drawings.

Figure 8:
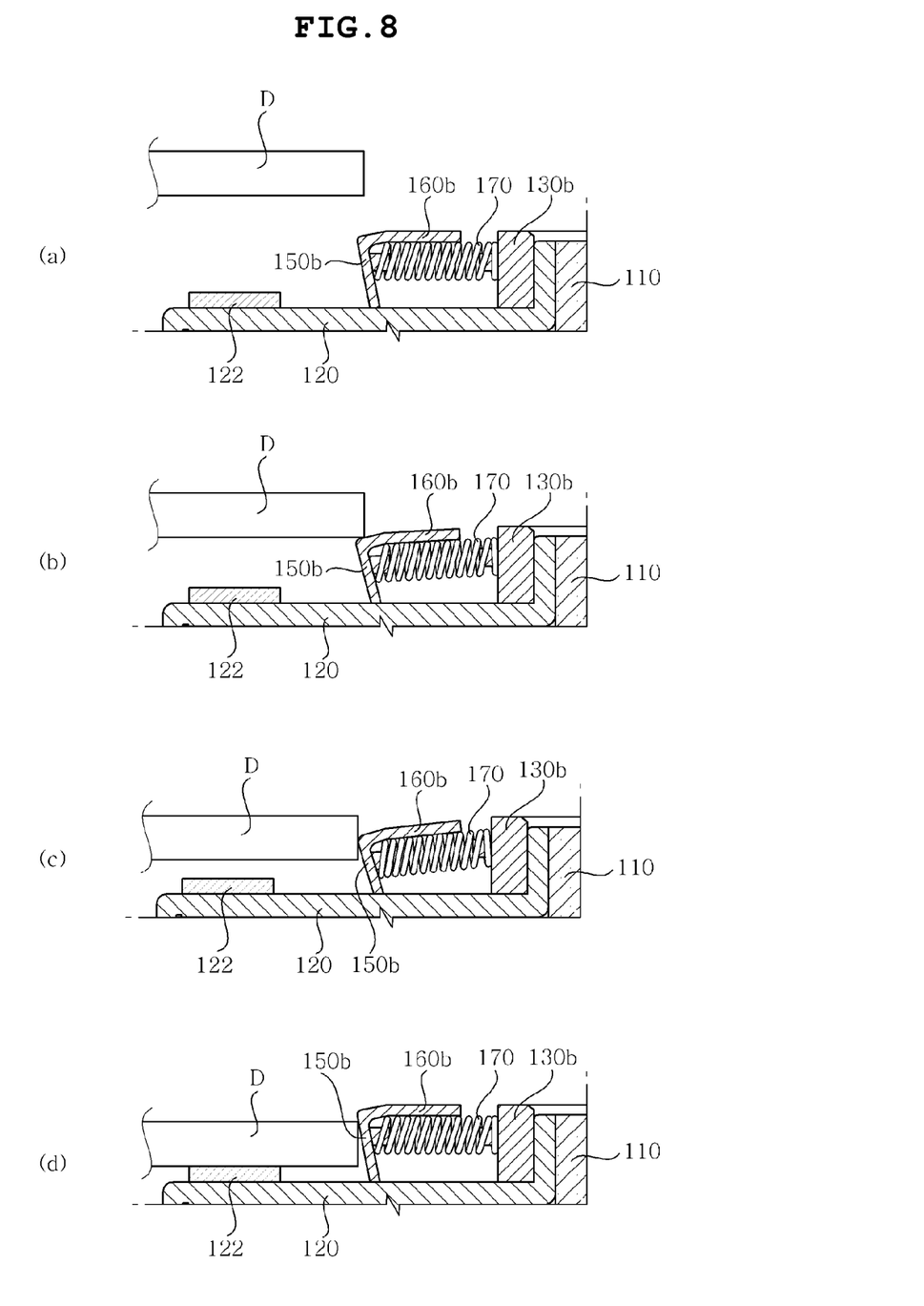
FIGS. 8A through 8D are views illustrating a process of mounting a disk to the disk chucking apparatus of FIGS. 6 and 7.

As shown in FIG. 8A, the user disposes the disk D above the disk chucking apparatus 100b such that the center hole of the disk D corresponds to the guides 180.

Thereafter, as shown in FIG. 8B, the user pushes disk D vertically downwards. Here, the outer diameter of the guides 180 is smaller than the diameter of the center hole of the disk D. However, because the outer ends of the chucking units, in detail, the upper ends of the vertical parts 150b which are inclined outwards and the outer ends of the upper horizontal parts 160b, protrude outwards from the guides 180, the circumferential inner edge of the disk D which defines the center hole comes into contact with the outer ends of the chucking units.

Subsequently, as shown in FIG. 8C, when the user further pushes the disk D vertically downwards, the chucking units are slightly bent downwards in the displacement spaces by the force applied to the chucking units in the direction in which the disk D is fitted over the disk chucking apparatus. In addition, the chucking units are elastically deformed inwards in the displacement spaces by the force applied inwards to the chucking units. As a result, the disk D is completely fitted over the disk chucking apparatus.

Finally, as shown in FIG. 8D, when the mounting of the disk D to the disk chucking apparatus is completed, the chucking units are returned to their original states by their own elastic force. Thereby, the vertical parts 150b which are inclined outwards hold the disk D, thus fastening the disk D to the disk chucking apparatus.

Disk Chucking Apparatus

Third Embodiment

Figure 9:
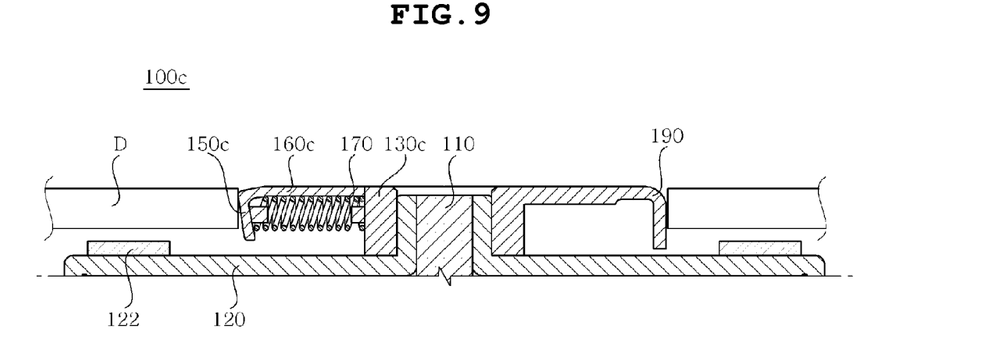
FIG. 9 is a sectional view illustrating a disk chucking apparatus, according to a third embodiment of the present invention.
Figure 10:
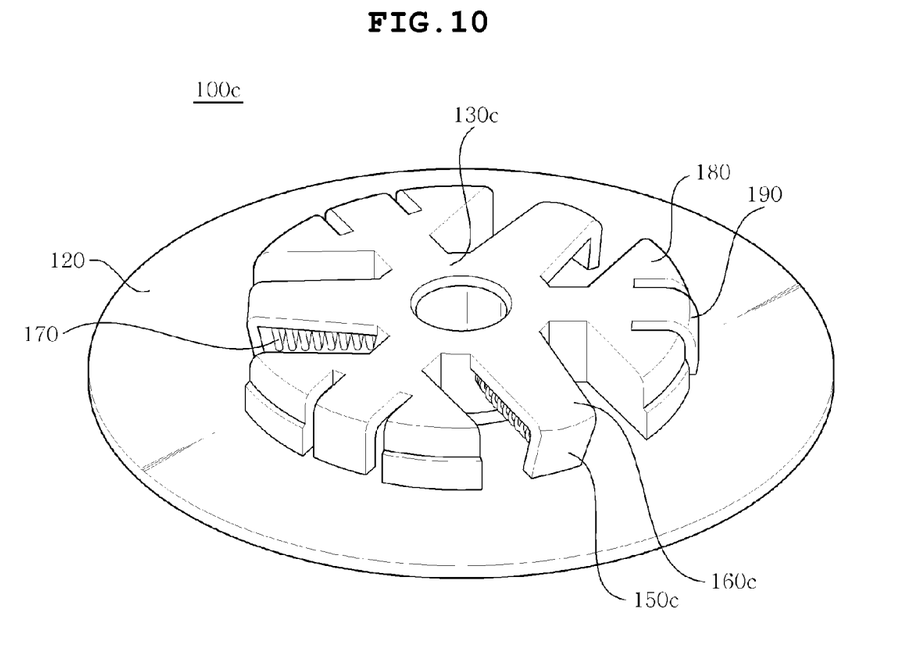
FIG. 10 is a perspective view of the disk chucking apparatus of FIG. 9.

FIG. 9 is a sectional view illustrating a disk chucking apparatus 100c, according to a third embodiment of the present invention. FIG. 10 is a perspective view of the disk chucking apparatus 100c. Hereinafter, the disk chucking apparatus 100c according to the third embodiment of the present invention will be described with reference to these drawings. The general construction of the third embodiment is similar to that of the first or second embodiment except for the structure of a chucking unit, so that the same or corresponding reference numerals are used to designate the same or similar components, and explanation of the overlapped portions will be omitted.

As shown in FIGS. 9 and 10, in the disk chucking apparatus 100c according to the third embodiment, each chucking unit includes an upper horizontal part 160c and a vertical part 150c. The upper horizontal part 160c extends outwards from an upper end of a central boss 130c in an approximately horizontal direction. The vertical part 150c is bent downwards from the outer end of the upper horizontal part 160c and extends a predetermined length in a direction inclined inwards.

The outer end of the upper horizontal part 160c has a ramp structure to facilitate the insertion of the chucking unit into the center hole of the disk D. In the embodiment, the upper horizontal part 160c has a partially-open structure, in other words, has an opening in a predetermined portion thereof, to increase its own elastic force.

The vertical part 150c can be elastically deformed inwards by the force applied thereto when the disk D is mounted to the disk chucking apparatus 100c, thus making the chucking of the disk D possible. Furthermore, the vertical part 150c functions to hold the disk D which is completely fitted over the disk chucking apparatus 100c. Here, the vertical part 150c is spaced apart from the rotor casing 120 and the central boss 130c, thus forming a displacement space in which the chucking unit can be elastically deformed downwards and inwards.

FIGS. 11A through 11D are views illustrating a process of mounting the disk D to the disk chucking apparatus 100c of FIGS. 9 and 10. Hereinafter, the operation of the disk chucking apparatus 100c according to the third embodiment will be explained with reference to these drawings.

Figure 11:
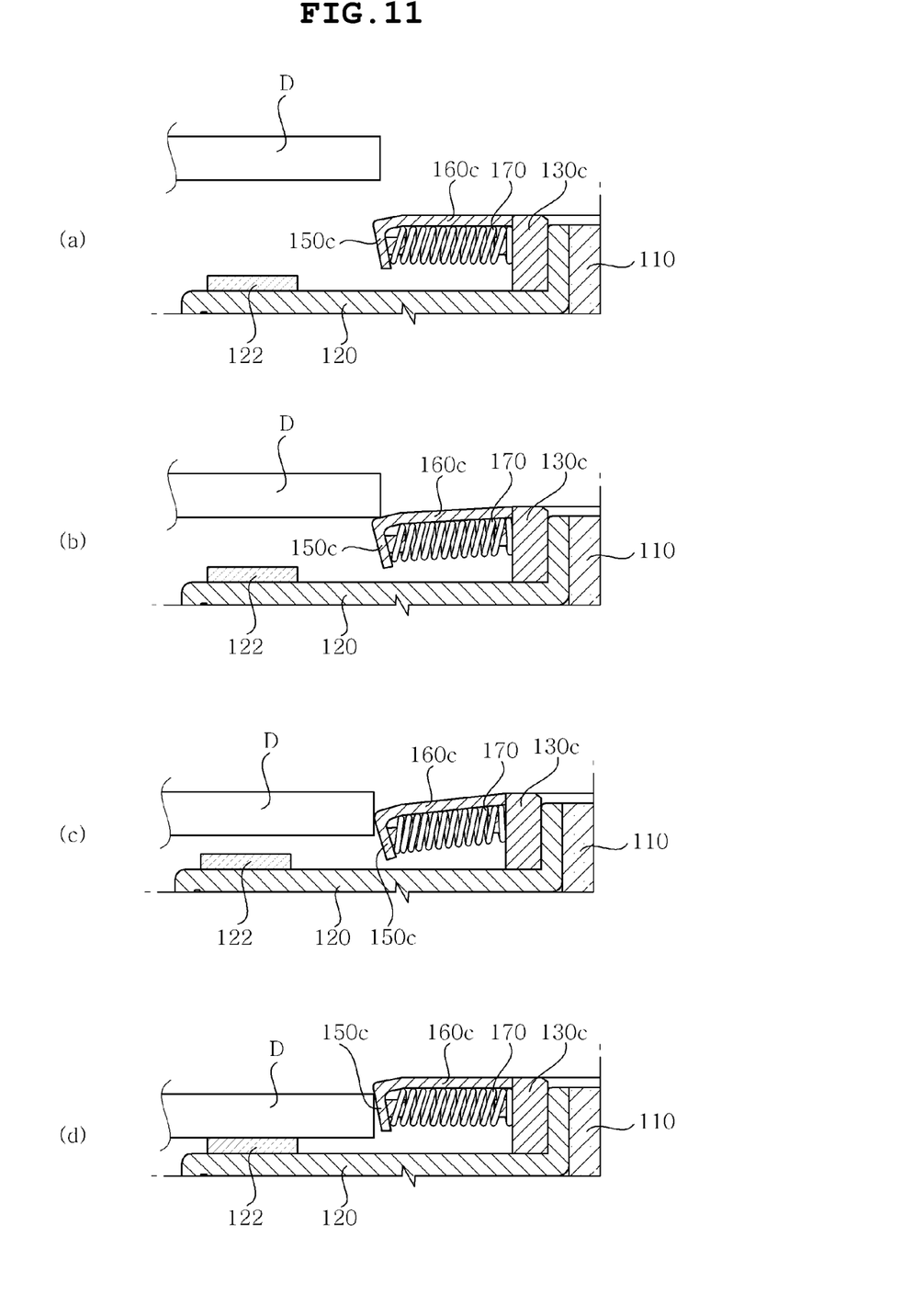
FIGS. 11A through 11D are views illustrating a process of mounting a disk to the disk chucking apparatus of FIGS. 9 and 10.

As shown in FIG. 11A, the user disposes the disk D above the disk chucking apparatus 100c such that the center hole of the disk D corresponds to the guides 180.

Thereafter, as shown in FIG. 11B, the user pushes disk D vertically downwards. Here, the outer diameter of the guides 180 is smaller than the diameter of the center hole of the disk D. However, because the outer ends of the chucking units, in detail, the upper ends of the vertical parts 150c which are inclined outwards and the outer ends of the upper horizontal parts 160c, protrude outwards from the guides 180, the circumferential inner edge of the disk D which defines the center hole comes into contact with the outer ends of the chucking units.

Subsequently, as shown in FIG. 11C, when the user further pushes the disk D vertically downwards, the chucking units are slightly bent downwards in the displacement spaces by the force applied thereto in the direction in which the disk D is fitted over the disk chucking apparatus. In addition, the chucking units are elastically deformed inwards in the displacement spaces by the force applied inwards to the chucking units. As a result, the disk D is completely fitted over the disk chucking apparatus.

Finally, as shown in FIG. 11D, when the mounting of the disk D to the disk chucking apparatus is completed, the chucking units are returned to their original states by their own elastic force. Thereby, the vertical parts 150b which are inclined outwards hold the disk D, thus fastening the disk D to the disk chucking apparatus.

As described above, a disk chucking apparatus of the present invention chucks a disk using structural elastic force of chucking units, thus simplifying the structure and the manufacturing process, and reducing the production cost.

Although the embodiments of the present invention have been disclosed for illustrative purposes, it will be appreciated that the disk chucking apparatus of the invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. An apparatus for chucking a disk placed onto a rotor casing coupled to a motor for providing a rotating force to the rotor casing, the apparatus comprising:
    a central boss coupled to a rotating shaft of the motor;
    a guide extending from the central boss outwards, the guide being inserted into a center hole of the disk; and
    a chucking unit extending from the central boss outwards, the chucking unit being elastically deformable inwards when being pushed by the disk that is fitted over the guide,
    wherein the chucking unit is integrated with the central boss, and
    the chucking unit comprises:
        a lower horizontal part connected with the central boss, extending from a lower portion of the central boss outwards in a horizontal direction;
        a vertical part bent from an outer end of the lower horizontal part upwards, the vertical part extending a predetermined length in a direction inclined outwards;
        an upper horizontal part extending from an upper end of the vertical part inwards in a horizontal direction; and
        an elastic member provided between the central boss and the vertical part to provide an elastic force inwards to the vertical part,
        the elastic member being located in a space which is formed by the lower horizontal part, the vertical part and the upper horizontal part.

2. The apparatus as set forth in claim 1, wherein the lower horizontal part or the upper horizontal part has an opening therein.

3. The apparatus as set forth in claim 1, wherein the lower horizontal part is either in contact or not in contact with the rotor casing.

4. The apparatus as set forth in claim 1, wherein an elastic piece is integrally provided in a circumferential outer surface of the guide, the elastic piece having an outer end coming into contact with a circumferential inner surface of the center hole of the disk to elastically support the disk using elastic force inherent thereto.

5. The apparatus as set forth in claim 1, wherein
    the guide comprises a plurality of guides spaced apart from each other at regular angular intervals around the central boss, and
    the chucking unit comprises a plurality of chucking units spaced apart from each other at regular angular intervals around the central boss.

6. An apparatus for chucking a disk placed onto a rotor casing coupled to a motor for providing a rotating force to the rotor casing, the apparatus comprising:
    a central boss coupled to a rotating shaft of the motor;
    a guide extending from the central boss outwards, the guide being inserted into a center hole of the disk; and
    a chucking unit extending from the central boss outwards, the chucking unit being elastically deformable inwards when being pushed by the disk that is fitted over the guide,
    wherein the chucking unit is integrated with the rotor casing, and
    the chucking unit comprises:
        a vertical part connected with the rotor casing, extending from the rotor casing upwards, the vertical part extending a predetermined length in a direction inclined outwards;
        an upper horizontal part extending from an upper end of the vertical part inwards in a horizontal direction; and
        an elastic member provided between the central boss and the vertical part to provide an elastic force inwards to the vertical part,
        the elastic member being located in a space which is formed by the vertical part and the upper horizontal part.

7. The apparatus as set forth in claim 6, wherein the upper horizontal part has an opening therein.

8. The apparatus as set forth in claim 6, wherein an elastic piece is integrally provided in a circumferential outer surface of the guide, the elastic piece having an outer end coming into contact with a circumferential inner surface of the center hole of the disk to elastically support the disk using elastic force inherent thereto.

9. The apparatus as set forth in claim 6, wherein
the guide comprises a plurality of guides spaced apart from each other at regular angular intervals around the central boss, and
the chucking unit comprises a plurality of chucking units spaced apart from each other at regular angular intervals around the central boss.

10. An apparatus for chucking a disk placed onto a rotor casing coupled to a motor for providing a rotating force to the rotor casing, the apparatus comprising:
a central boss coupled to a rotating shaft of the motor;
a guide extending from the central boss outwards, the guide being inserted into a center hole of the disk; and
a chucking unit extending from the central boss outwards, the chucking unit being elastically deformable inwards when being pushed by the disk that is fitted over the guide,
wherein the chucking unit is integrated with the central boss, and
the chucking unit comprises:
an upper horizontal part connected with the central boss, extending from an upper portion of the central boss outwards in a horizontal direction;
a vertical part extending from the upper horizontal part downwards, the vertical part extending a predetermined length in a direction inclined inwards; and
an elastic member provided between the central boss and the vertical part to provide an elastic force inwards to the vertical part,
the elastic member being located in a space which is formed by the upper horizontal part and the vertical part.

11. The apparatus as set forth in claim 10, wherein the upper horizontal part has an opening therein.

12. The apparatus as set forth in claim 10, wherein an elastic piece is integrally provided in a circumferential outer surface of the guide, the elastic piece having an outer end coming into contact with a circumferential inner surface of the center hole of the disk to elastically support the disk using elastic force inherent thereto.

13. The apparatus as set forth in claim 10, wherein
the guide comprises a plurality of guides spaced apart from each other at regular angular intervals around the central boss, and
the chucking unit comprises a plurality of chucking units spaced apart from each other at regular angular intervals around the central boss.

* * * * *